United States Patent [19]

Icking et al.

[11] 3,873,020

[45] Mar. 25, 1975

[54] SAFETY DEVICE FOR SEPARATORS

[75] Inventors: Freidrich Icking; Klaus Bodemar, both of Oelde, Germany

[73] Assignee: Westfalia Separator AG, Oelde, (Westfalen), Germany

[22] Filed: Sept. 20, 1972

[21] Appl. No.: 182,103

[30] Foreign Application Priority Data

Sept. 18, 1970 Germany............................ 2046084

[52] U.S. Cl. .............................. 233/1 B, 210/146
[51] Int. Cl. ............................................. B04b 7/06
[58] Field of Search .............. 233/1 R, 1 B; 210/146

[56] References Cited
UNITED STATES PATENTS

| 1,582,789 | 4/1926 | Schmauk | 210/146 |
| 1,582,790 | 4/1926 | Schaum et al. | 210/146 |
| 1,582,791 | 4/1926 | Bodenschatz | 210/146 |
| 2,018,433 | 10/1935 | Aitken | 210/146 |
| 2,591,317 | 4/1952 | Tholl | 233/1 B |

FOREIGN PATENTS OR APPLICATIONS

| 8,223 | 6/1915 | United Kingdom | 210/146 |
| 390,578 | 4/1933 | United Kingdom | 210/146 |

Primary Examiner—George H. Krizmanich
Attorney, Agent, or Firm—Burgess, Dinklage & Sprung

[57] ABSTRACT

A safety device for centrifugal separators for preventing opening of the separator housing for inspection and servicing the machine during rotating of the drum. The parts of the separator which must be detached for this purpose are blocked and released by a turnable or moveable arm of a catch mechanism. In the path of this arm the safety device is arranged which is outfitted with an axially displacable plunger to whose lower end a swing-out element is connected. During rotation of the drum the swing-out element prevents displacement of the plunger to its lowest position and thus preventing releasing of the turnable or moveable arm of the catch mechanism. After the drum has stopped rotating, the swing-out element permits the displacement of the plunger to its lowest position thereby releasing the turnable or moveable arm of the catch mechanism.

14 Claims, 7 Drawing Figures

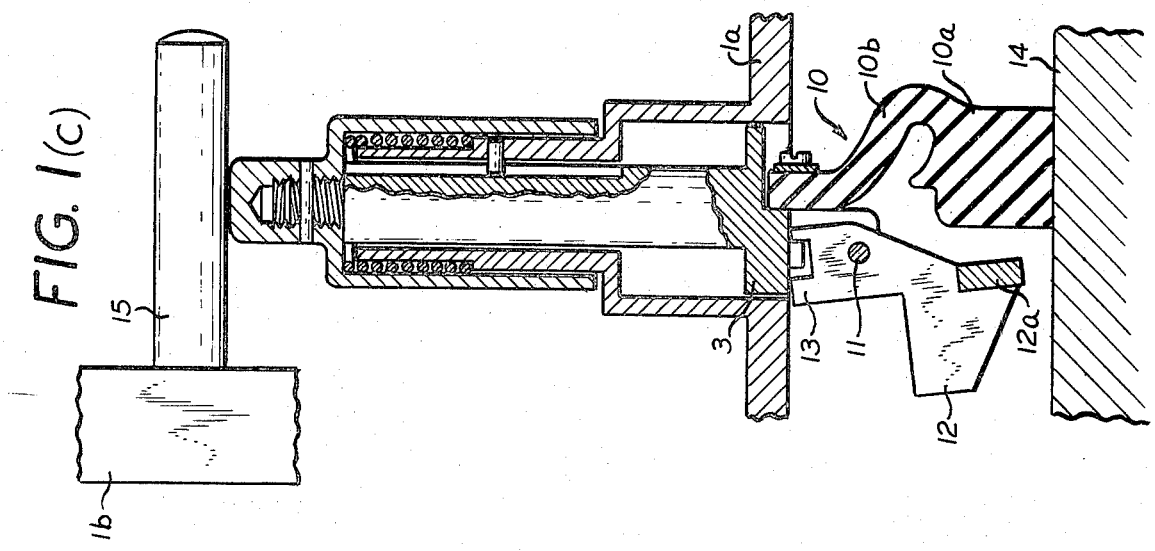
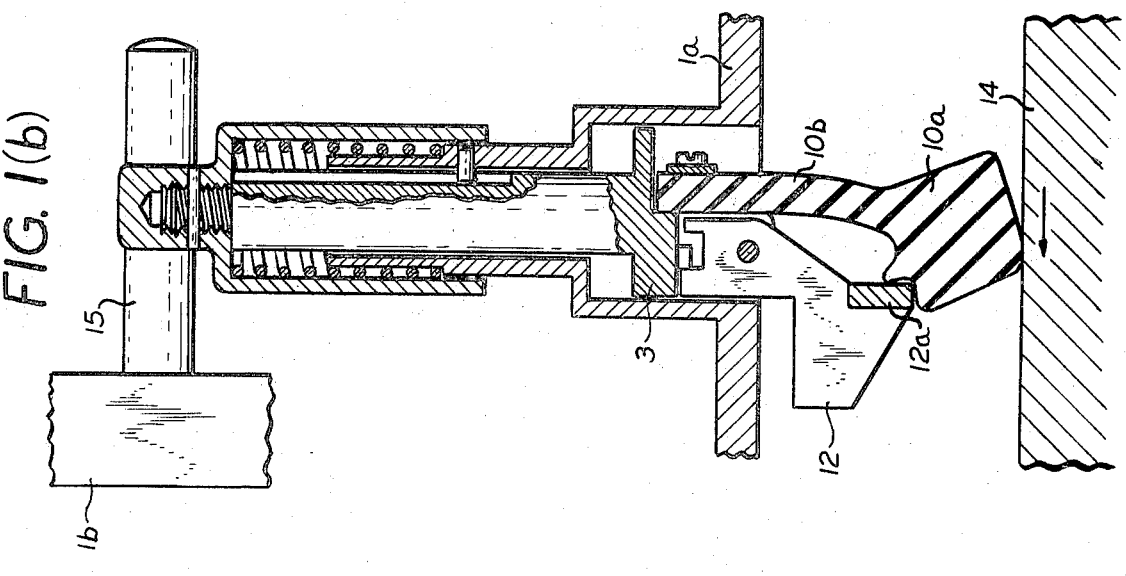
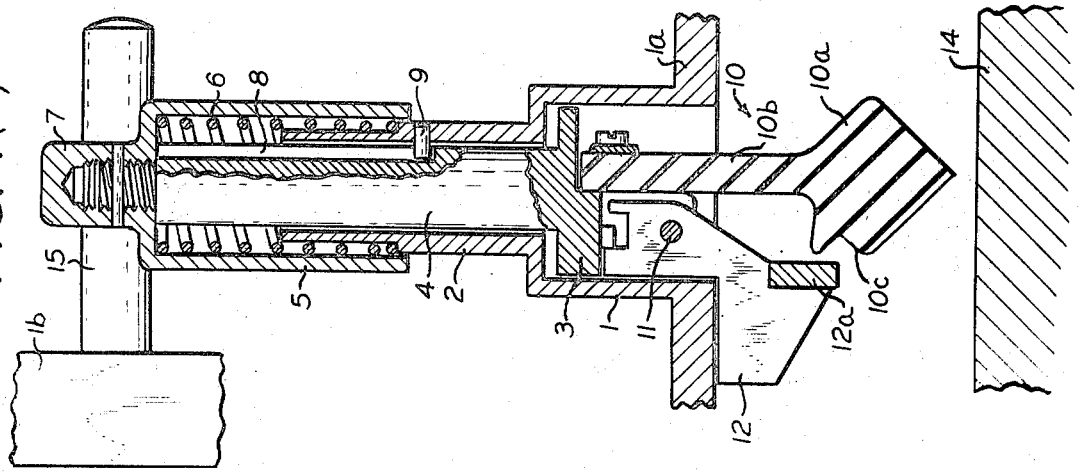

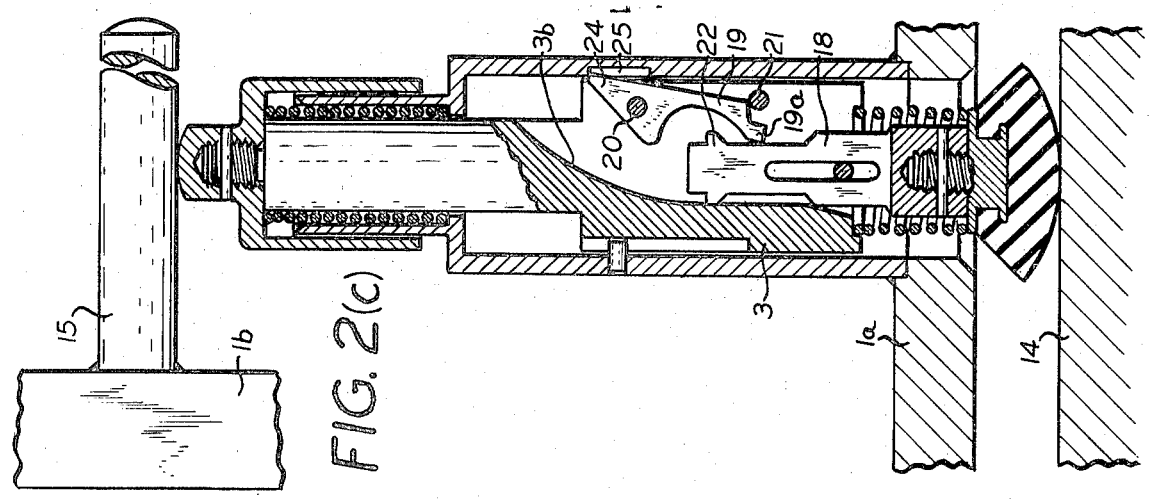
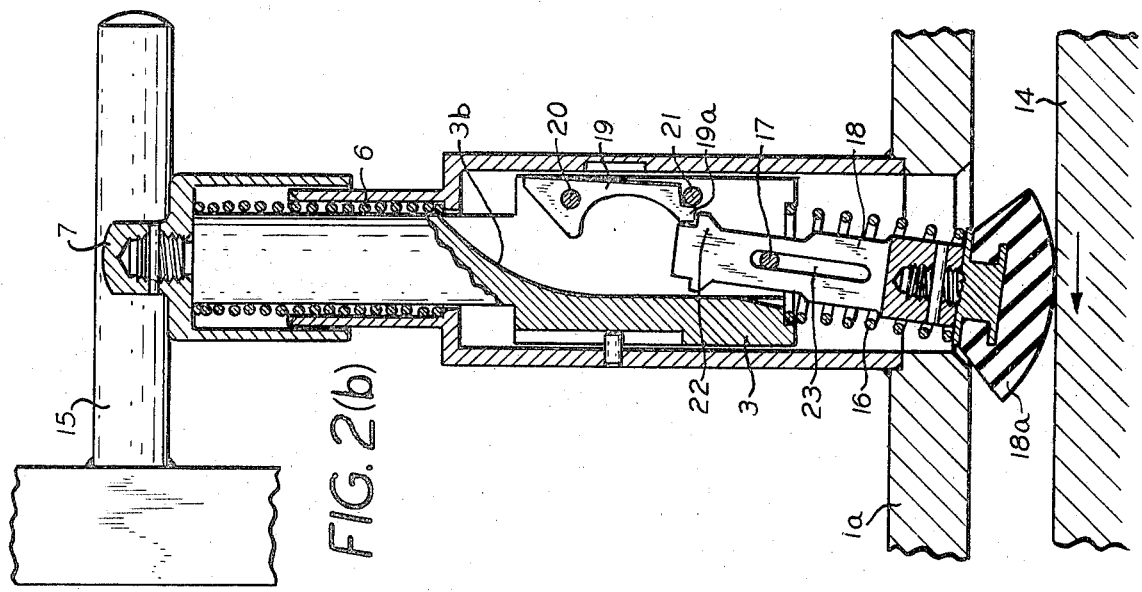
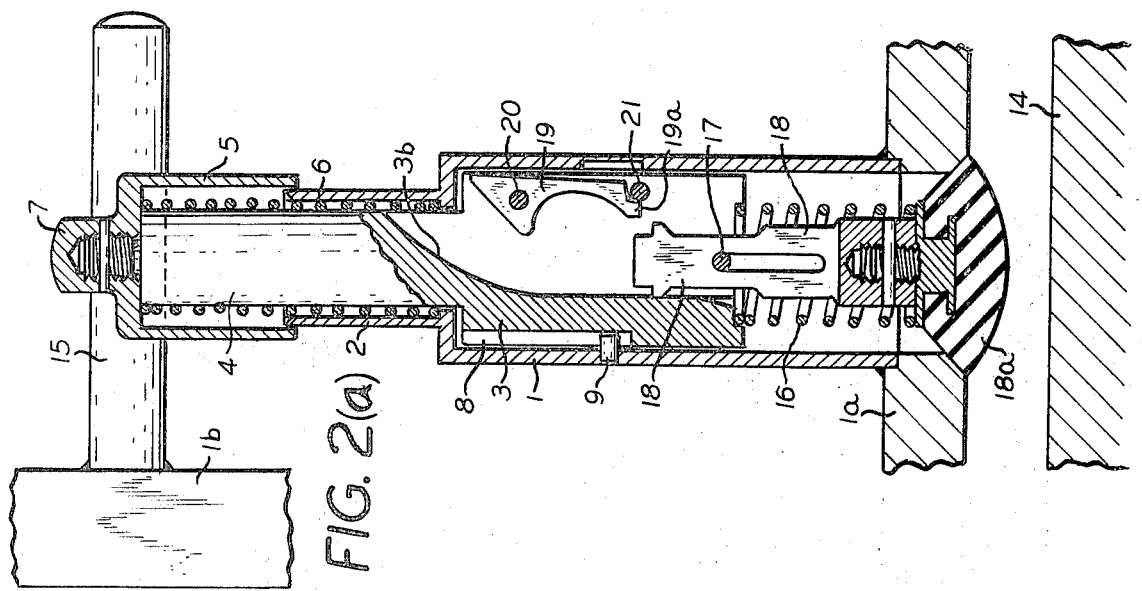

SAFETY DEVICE FOR SEPARATORS

BACKGROUND

The invention relates to separators both of the vertical and of the horizontal type in which the drum is contained in a fully enclosed, stationary housing. The housings are provided with a hood, a lid-like cap or the like, which must be raised up, lifted off or pulled aside before the inspection or the disassembly of the drum. Infeed or outfeed fittings may also be fastened to this hood, lid or the like, which will have to be released prior to opening.

The invention concerns a device which prevents the release of such fittings or the opening of the hood or lid while the drum is rotating, permitting that only when the drum is fully stopped.

German Pat. No. 1,101,296 discloses a safety device for centrifuges to whose hood there is fastened a gripping body for the skimmer disk shaft, which is locked against rotation when the drum is rotating. The locking device consists of a rotatable or movable element which is displaceable by spring force to the one end position and by electrical means to the other end position. The control of the locking action by the rotation of the drum is achieved by providing a generator on a shaft of the centrifuge drive to produce the electrical voltage.

Since the voltage produced by a generator at low rotatory speed is so small that it is not sufficient to serve as a locking voltage, German Petty Pat. No. 6,948,132 proposes the use of a stationary state detector which consists essentially of an inductive pickup supplied with a high frequency voltage and a disk disposed on a drive shaft and provided on its circumference with a plurality of notches or projections, the disk revolving adjacent the pickup and producing a modulation of the high frequency voltage. The DC voltage obtained after rectification is proportional to the number of pulses per unit of time and can still be relatively high at as little as one revolution per minute. This voltage is used as an interlock voltage for the line connections fastened to the hood.

THE INVENTION

The invention is addressed to the problem of creating a more simple, mechanically acting safety device which can be used for virtually all kinds of separators. It is based on the idea of using the movement of the drum for the locking of the hood or of the fastening means which have to be released. As soon as the drum becomes stationary, the elements in question are released for unfastening.

The invention is characterized by a cylinder which is fastened to the separator housing and in which there is disposed a plunger which can be moved towards the drum against the bias of a spring and which bears at this end an outwardly swingable member which upon contact with the rotating drum, swings laterally and limits the movement of the plunger, thereby preventing the release of fastening means or the opening of the hood or lid, but when the drum is stationary permits further movement of the plunger and thereby permits the release of fastening means or the opening of the hood or lid.

In further development of this main idea of the invention, the safety device can be provided with an automatic detent means which holds the plunger in the end position in which it permits the housing to be opened. This device can be so constructed that, when the drum is re-started, the automatic detent is released and the plunger is restored to the locking position by the action of a return spring.

Thus in summary, the invention is concerned with a centrifugal separator having a rotatable drum, a stationary casing including a stationary detachable hood or lid to which also detachable inlet or outlet fittings may be fastened. The separator includes a catch mechanism having a release arm for selectively locking and unlocking the detachable elements by moving of the release arm. According to the invention a safety device is provided to prevent moving of the release arm of the catch mechanism whilst the drum is rotating. The safety device comprises a safety device housing mounted on the separator in a fixed position with respect to the rotating drum, e.g. on the separator casing, a plunger which is slidable arranged within said safety device housing and whose upper end is connected to an operating handle slidably mounted on the safety device housing and cooperating with a spring disposed between the operating handle and the safety device housing, and a swing-out element attached to the lower end of the plunger effecting by engaging with the surface of the drum the releasing or blocking of the release arm of the catch mechanism depending on the resting or rotating drum as the case may be.

EMBODIMENTS

Two embodiments of the invention are represented by way of example in the drawings, wherein:

FIGS. 1a–1c show the safety device with an outwardly pivoting member of elastic material, in first, second, and third positions, FIGS. 2a–2c show the safety device with a spring-elastic, rotatably mounted outwardly pivoting member in first, second and third positions.

Figure 1:
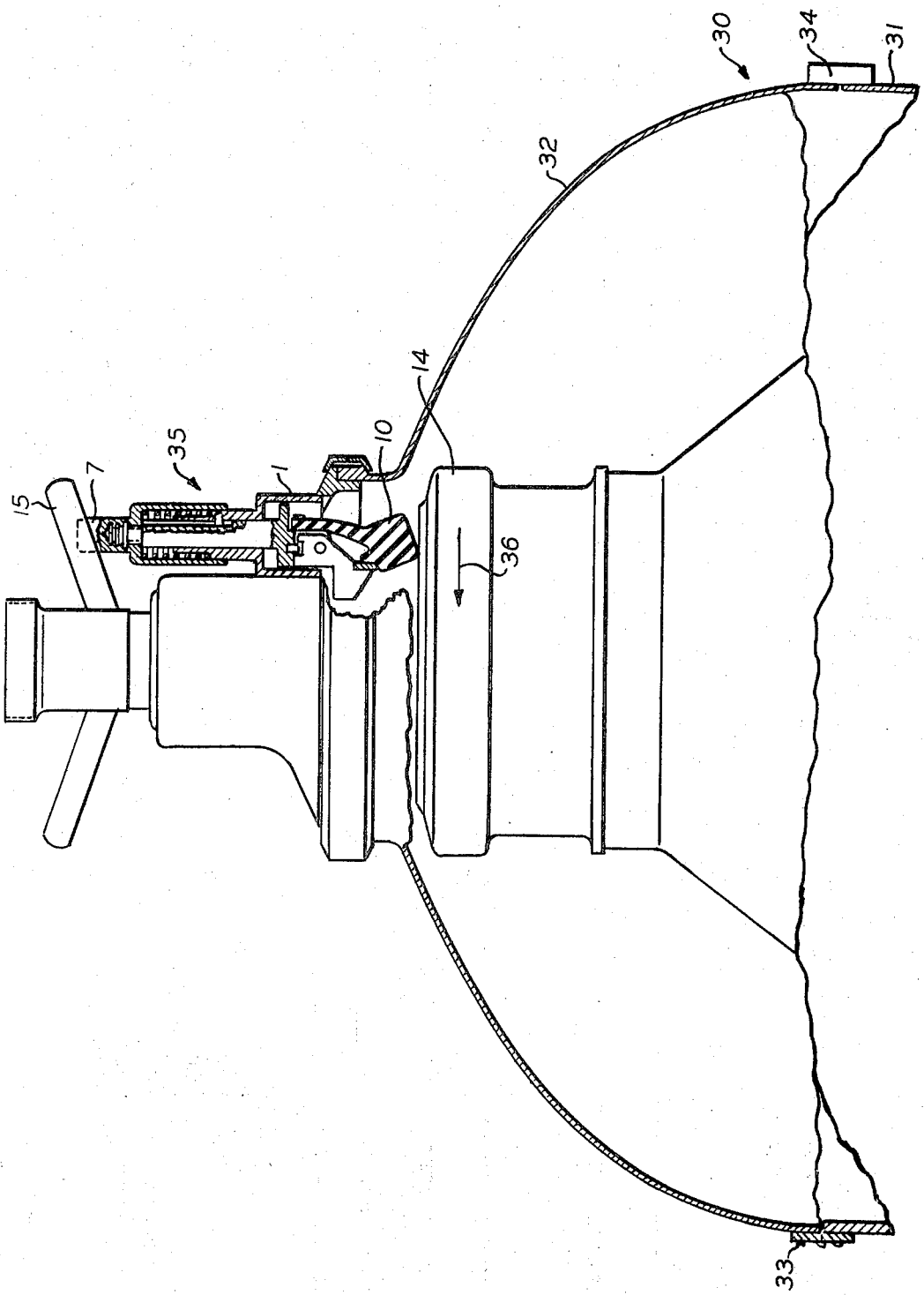
FIG. 1 shows a safety device according to the invention mounted on a centrifugal separator.

Referring to FIG. 1, a rotatably mounted drum 14 is disposed within an auxiliary part in the form of a stationery casing or housing 30 comprising two separable parts in the form of body portion 31, and cover 32 which are connected by a hinge 33. A releasable catch 34 is provided for securing the cover in the closed position. A safety device 35, described in detail with reference to FIGS. 1a–1c, is mounted on the cover 32. Lever 15 is connected by means not shown to the catch 34, and upon tuning of the lever, the catch is released. The safety device presents such tuning of the lever 15 when the drum is rotating as is indicated by the arrow 36, as is described in detail in reference to FIGS. 1a–1c.

In FIG. 1, the safety device 35 is rotated 90° in order to better illustrate the invention.

With reference to FIGS. 1a–1c, the safety device consists of a housing in the form of cylinder 1 which has a neck 2 of reduced diameter, mounted on one of the separable parts 1a of the machine housing. Associated with the housing is an assembly comprising a plunger 3, a shank 4 which together with its head 7 serves as a catch mechanism release arm, and a feeler member 10 which is a swingable arm. The plunger 3, which is displaceable axially in cylinder 1, has a shank 4 passes through the neck 2, and is affixed to head 7 of a casing 5 enveloping the neck 2. Between the neck 2 and the casing 5 there is disposed a helical spring 6 against whose bias the plunger 3 can be displaced in cylinder 1 when the head 7 is depressed. When the head 7 is released the spring 6 urges the plunger 3 to its upper end position. During these movements the shank 4 is secured against rotation by means of groove 8 and pin 9.

To the bottom end of the plunger 3 there is fastened a feeler member 10, which is a deflectable arm. The member 10, in the embodiment illustrated in FIGS. 1a–1c, consists of a feeler element 10a of resilient material, e.g., rubber, and a flexible arm 10b. When head 7 is depressed while the drum is still revolving, this element 10a cooperates with a rocker arm 12 pivotally mounted at point 11, thereby limiting the movement of the plunger 3. Thus, the recess 10c of feeler element 10a abuts with the bar 12a (FIG. 1b).

When the drum is stationary, feeler element 10a yields automatically towards the right so that member 10 and rocker arm 12 become disengaged. The plunger 3 can then be moved all the way to its end position by further depressing the head 7. When this end position is reached the rocker arm 12 loses contact with the inside wall of the cylinder 1. since its center of gravity is further from the axis than pivot point 11, it performs a rocking movement and causes the safety device to be retained in this position by the engagement of the detent lug 13 with the bottom edge of cylinder 1.

In FIGS. 1a, 1b and 1c are shown first, second and third positions of the safety device.

14 designates a portion of the outer surface of the drum, and 15 designates a lever which has to be pivoted or turned before opening the housing and is mounted on one of the separable parts 1b of the machine housing. This pivoting or turning is prevented by the head 7 of the casing 5 as long as the drum is rotating. Instead of the head 7 on casing 5 or on shank 2 some other blocking member can be disposed thereon and some other member which is to be blocked can be provided instead of the lever 15. The lever 15 and head 7 can be both operated manually.

FIG. 1a shows the safety device in the locked position, i.e., the lever 15 cannot be moved to open the housing since movement is blocked by the head 7.

FIG. 1b shows the device in action with the drum still not entirely stopped, and the same locking action being provided. Upon contacting the rotating drum, the resilient, element 10a performs a lateral excursion to the left and a recess 10c thereof engages the bottom bar 12a of the rocker arm 12, thereby limiting the movement of the plunger 3, and lever 15 is prevented by head 7 from undergoing any further excursion or pivoting so long as the drum 14 is rotating.

FIG. 1c shows the safety device with the drum stopped. The plunger 3 has been moved all the way to the end position, lug 13 or rocker arm 12 acts automatically as detent means, and lever 15 is released for operation to open the hood or housing of the machine. When after moving a lever 15 to close the housing the drum is started up again, member 10 collides with the rocker arm 12 causing disengagement of lug 13 and the housing 1a, and the device returns under the bias of spring 6 into the locked position (FIG. 1a).

In the embodiment illustrated in FIG. 2, the resilient feeler member 10 (FIG. 1) is replaced by another feeler member 18 which is a swingable arm resiliently held by a spring 16 mounted pivotally at point 17 by a pin and slot joint. The rocker arm 19, which is of different construction in this case, is disposed in a recess 3b in plunger 3 and is pivotally mounted at point 20. The pin 21 also mounted in plunger 3, serves as an abutment.

FIG. 2a shows the device in the locked position: FIG. 2b with the drum still not completely stopped and locking still provided; and FIG. 2c with the drum stationary and the mechanism unlocked for opening of the housing by pivoting of lever 15.

Upon partial depression of the head 7 while the drum 14 is still rotating, the rubber feeler element 18a of member 18 pivots laterally about the pivot point 17, whereupon the ear 22 engages the bottom lug 19a of the rocker arm 19. Since the pin 20 is fastened to the plunger 3, no further downward displacement of the plunger 3 is possible. See FIG. 2b. Lever 15, therefore, cannot be operated while the drum is still running since head 7 prevents the necessary moving thereof, as shown in FIG. 2b.

When the drum stops, the swingable arm 18 returns to an upright position under the action of spring 16, acting in conjunction with the pin 17 and the longitudinal slot 23, so as to bring about the release of ear 22.

The head 7 and plunger 3 can then be pushed down, whereupon rocker arm 19 by reason of its center of gravit performs a pivoting movement about its pivot point 20 so that its upper lug 24 engages the recess 25 in cylinder 1 (FIG. 2c). This locks the device in this end position. Lever 15 is then free, and the separator housing can be opened.

Upon the restarting of the drum, arm 18 rocks laterally and collides with the bottom end of the rocker arm 19, thereby releasing upper lug 24. Under the bias of spring 6 the safety device returns to the locked position (FIG. 2a).

When the separator housing is opened, if the safety device is removed from the drum together with a part of the housing, the spring 16 is released and draws member 18 downward, whereupon the ear 22 engages the bottom end of the rocker arm 19, which likewise releases the safety device so that it returns to the position shown in FIG. 2a and the bottom orifice of the cylinder 1 is closed.

What is claimed is:

1. In a machine comprising a rotatable member and an auxiliary part comprising separable elements and having a catch mechanism including a release arm for selectively locking and unlocking the separable elements of the auxiliary part by movement of the release arm: a safety device to insure that the drum is stopped before unlocking of the separable elements, comprising, a. a safety device housing mounted on the machine in a normally fixed position with respect to the rotating member,
 b. an assembly including a plunger, a feeler member attached to one end of the plunger, and a catch mechanism stop attached to the other end of the plunger, axially slidably mounted in the safety device housing for movement between a first position wherein the feeler member is disengaged from the rotatable member and the catch mechanism stop is interposed in the path of the catch mechanism release arm preventing movement of the release arm to unlock the separable parts, a second position wherein the feeler member is in engagement with the rotatable member and the catch mechanism stop is still interposed as aforesaid, and a third position wherein the feeler member is in engagement with the rotatable member and the catch mechanism stop is out of the path of the catch mechanism release arm permitting movement of the release arm to unlock the separable parts,
c. means for arresting travel of the feeler assembly in said intermediate position when the drum is rotating and releasing the feeler assembly for movement to the third position upon stopping of the drum.

2. A machine according to claim 1, said auxiliary part being a housing for the drum, said safety device housing being mounted on one of the separable parts of the drum housing.

3. In a machine comprising a rotatable member and an auxiliary part comprising separable elements and have a catch mechanism including a release arm for selectively locking and unlocking the separable elements of the auxiliary part by movement of the release arm: a safety device to insure stoppage of the drum before unlocking of the separable elements, comprising:
  a. a safety device housing mounted on the machine in a normally fixed position with respect to the rotating drum,
  b. an assembly including a plunger, a feeler member attached to one end of the plunger, and a catch mechanism stop attached to the other end of the plunger, axially slidably mounted in the safety device housing for movement between a first position wherein the feeler member is disengaged from the rotatable member and the catch mechanism stop is interposed in the path of the catch mechanism release arm preventing movement of the release are to unlock the separable parts, a second position wherein the feeler member is in engagement with the rotatable drum and the catch mechanism stop is still interposed as aforesaid and a third position wherein the feeler member is in engagement with the rotatable member and the catch mechanism stop is out of the path of the catch mechanism release are permitting movement of the release arm to unlock the separable parts,
  c. the feeler member being mounted on the plunger for a first movement upon engagement of the feeler member and the rotating drum,
  d. stop means for engagement during said first movement to limit travel of the assembly to said second position,
  e. the feeler member being mounted on the plunger for a second movement upon stopping of the drum,
  f. said second movement being effective to disengage said stop means permitting travel of the feeler assembly to said third position.

4. A machine according to claim 3, and means yieldingly biasing the feeler assembly to said first position.

5. A machine according to claim 4, said feeler member comprising a flexible arm one end of which is attached to the plunger, and a feeler element for engaging the drum attached to the other end of the flexible arm, said stop means comprising two cooperating abutments one of which is mounted on the feeler element and the other of which is mounted on the plunger, said first movement being flexing arm for interengagement of the abutments, said second movement being another flexing of the flexible arm causing disengagement of the abutments.

6. A machine according to claim 5, said cooperating abutments being a recess in the feeler element and a bar mounted on the plunger for engagement in the recess.

7. A machine according to claim 5, a rocker arm mounted on the plunger, the abutment mounted on the plunger being carried by said rocker arm, said rocker arm being pivotally mounted on the plunger for pivoting thereof and locking the plunger in said third position.

8. A machine according to claim 7, the starting of the drum being effective to disengage the rocker arm from the locking position thereof.

9. A machine according to claim 4, said feeler member comprising a swingable arm, a pin-in-slot connection by which one end of the swingable arm is attached to the plunger, a feeler element for engaging the drum attached to the other end of the swingable arm, and means biasing the swingable arm to distend it from the plunger, said stop means comprising two cooperating abutments one of which is mounted on the feeler member and the other of which is mounted on the plunger, said first movement being pivoting of the swingable arm for interengagement of the abutments, said second movement being another pivoting of the swingable arm causing disengagement of the abutments.

10. A machine according to claim 9, the abutment mounted on the plunber being carried by a rocker arm pivotally mounted on the plunger for pivoting thereof and locking the plunger in said third position.

11. A machine according to claim 10, the starting of the drum being effective to disengage the rocker arm from the locking position thereof.

12. A machine according to claim 4, and means for locking the plunger in said third position.

13. A machine according to claim 4, and means for locking the plunger in said third position, starting of the drum being effective to disengage the locking in the third position.

14. A machine according to claim 2, said auxiliary part being a housing for the drum, said safety device housing being mounted on one of the separable parts of the drum housing.

* * * * *

UNITED STATES PATENT OFFICE
CERTIFICATE OF CORRECTION

Patent No. 3,873,020  Dated March 25, 1975

Inventor(s) Freidrich Icking et al.

It is certified that error appears in the above-identified patent and that said Letters Patent are hereby corrected as shown below:

Summary page, [22], change "Filed: Sept. 20, 1972"

to -- Filed Sept. 20, 1971 --.

Signed and Sealed this twenty-fifth Day of November 1975

[SEAL]

Attest:

RUTH C. MASON
Attesting Officer

C. MARSHALL DANN
Commissioner of Patents and Trademarks

FORM PO-1050 (10-69)